United States Patent
Atkins et al.

(10) Patent No.: US 10,132,333 B2
(45) Date of Patent: Nov. 20, 2018

(54) ACTUATOR UTILIZING PNEUMATIC MUSCLES

(71) Applicant: Bell Helicopter Textron Inc., Fort Worth, TX (US)

(72) Inventors: Brady G. Atkins, Irving, TX (US); Troy Schank, Keller, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 373 days.

(21) Appl. No.: 14/540,241

(22) Filed: Nov. 13, 2014

(65) Prior Publication Data

US 2016/0138621 A1    May 19, 2016

(51) Int. Cl.
  *F15B 15/10*    (2006.01)
  *B64C 13/48*    (2006.01)

(52) U.S. Cl.
  CPC ............ *F15B 15/103* (2013.01); *B64C 13/48* (2013.01); *F15B 2211/6336* (2013.01); *F15B 2211/6656* (2013.01); *F15B 2211/715* (2013.01); *F15B 2211/72* (2013.01)

(58) Field of Classification Search
  CPC .................. F15B 15/103; F15B 15/262; F15B 2211/864; F15B 2211/8755
  See application file for complete search history.

(56) References Cited

U.S. PATENT DOCUMENTS

| | | | | |
|---|---|---|---|---|
| 4,615,260 A * | 10/1986 | Takagi | ..................... | B25J 9/142 901/22 |
| 4,664,232 A * | 5/1987 | Takagi | ..................... | B25J 9/104 188/364 |
| 4,689,538 A * | 8/1987 | Sakaguchi | ............... | B25J 9/046 318/568.21 |
| 4,784,042 A * | 11/1988 | Paynter | .................... | B25J 9/142 414/7 |
| 6,532,400 B1 | 3/2003 | Jacobs | | |
| 6,796,918 B1 * | 9/2004 | Cinquin | .................. | F15B 15/02 198/832.1 |
| 7,607,380 B2 * | 10/2009 | Hiramatsu | ............ | F15B 15/103 91/1 |

(Continued)

FOREIGN PATENT DOCUMENTS

| | | |
|---|---|---|
| DE | 3630822 | 3/1987 |
| EP | 1683973 | 7/2006 |

OTHER PUBLICATIONS

Communication pursuant to Article 94(3) EPC issued in European Application No. 15150846.2 dated Oct. 16, 2015, 6 pages.

(Continued)

*Primary Examiner* — F. Daniel Lopez
*Assistant Examiner* — Matthew Wiblin (57) ABSTRACT

One example of an actuation system includes a pneumatic muscle connected to a component to be actuated. The system also includes an actuation member connected in series to the pneumatic muscle and valve connected to the pneumatic muscle to control a pressure in the pneumatic muscle. The system also includes a positioning mechanism connected to the component to control a movement of the component and a controller connected to the pneumatic muscle, the valve, and the positioning mechanism, the controller to control actuation of the component by controlling the pressure in the pneumatic muscle.

20 Claims, 8 Drawing Sheets

(56) References Cited

U.S. PATENT DOCUMENTS

| | | | | |
|---|---|---|---|---|
| 7,798,036 | B2* | 9/2010 | Okazaki | B25J 9/1075 74/490.05 |
| 7,837,144 | B2* | 11/2010 | Kothera | B63B 1/248 244/99.2 |
| 8,360,997 | B2* | 1/2013 | Ferrara | A61H 1/02 601/5 |
| 9,039,372 | B2* | 5/2015 | Hancock | F03D 1/0675 416/146 R |
| 2003/0172801 | A1* | 9/2003 | Reininger | F15B 15/103 91/1 |
| 2008/0223680 | A1* | 9/2008 | Hardtle | F15B 15/103 192/31 |
| 2009/0085444 | A1* | 4/2009 | Alvarez Icaza Rivera | H01L 41/0478 310/365 |
| 2011/0067563 | A1* | 3/2011 | Woods | A61F 2/08 92/90 |
| 2013/0001357 | A1* | 1/2013 | Cyrot | B64C 13/42 244/99.4 |
| 2013/0014499 | A1* | 1/2013 | Gray, Jr. | B60K 6/12 60/327 |
| 2014/0034779 | A1* | 2/2014 | Fenny | B64C 27/72 244/17.25 |
| 2015/0305554 | A1* | 10/2015 | Dorsten | A47J 37/0611 426/233 |

OTHER PUBLICATIONS

Communication re supplemental European Search Report in European Application No. 15150846.2 dated Sep. 7, 2015, 5 pages.
Communication Pursuant to Article 94(3) EPC issued in European Application No. 15150846.2 dated Apr. 22, 2016; 4 pages.
Partial European Search Report issued in European Application No. 15150846.2 dated May 19, 2015; 6 pages.
Daerden et al. Pneumatic Artificial Muscles: actuators for robotics and automation, Vrije Universiteit Brussel, Dept. of Mechanical Engineering, 11 pages.
Plattenburg, "Pneumatic Actuators: a Comparison of Energy-to-Mass Ration", Proceedings of the 20005 IEEE, Jun. 28-Jul. 1, 2005, Chicago, IL, paper FrA01-05; 5 pages.
Festo, Fluidic Muscle DMSP/MAS, brochure, Jun. 2008; 34 pages.

* cited by examiner

FIG. 6 though the expected position does not match the measured position. The brake can be configured to activate to lock movement of the component in response to receiving the control signal from the controller. The system can include a position transducer connected to the controller, wherein the position transducer is configured to transmit a plurality of position signals to the controller at a respective plurality of time instants, each position signal identifying the measured position of the component at a respective time instant. The controller can be a first controller, and the system can include a first position transducer connected to the first controller, wherein the first position transducer is configured to transmit a plurality of first position signals to the first controller at a respective plurality of time instants, each first position signal identifying a measured position of the component at a respective time instant. The system can also include a second controller connected to the brake and a second position transducer connected to the second controller, wherein the second position transducer is configured to transmit a plurality of second position signals to the second controller at the respective plurality of time instants, each second position signal identifying a measured position of the component at a respective time instant. The brake can be a first brake, and, at a time instant, the first controller can be configured to perform operations including determining that the measured position determined by the first controller does not match the measured position determined by the second controller or that the first controller measured position does not match the first controller's expected position. The first controller can be configured to transmit a control signal to the first brake in response to a failure detection, and the first brake can be configured to activate to lock movement of the component in response to receiving the control signal from the first controller. The system can include a second brake connected to the component, and the second controller can be configured to transmit a control signal to the second brake in response to determining that the measured position determined by the first controller does not match the measured position determined by the second controller. The second brake can be configured to activate to lock movement of the component in response to receiving the control signal from the second controller. The actuation member can be a bias spring, wherein the bias spring is in a contracted state when the pneumatic muscle is in an extended state, and wherein the bias spring transitions to an extended state when the pneumatic muscle transitions to a contracted state. The controller can be configured to control the valve to alternately control the pressure in the pneumatic muscle between an increasing pressure and a decreasing pressure at a frequency up to 100 Hz. The positioning mechanism can include a biasing mechanism, the biasing mechanism configured to bias the component toward a position. The biasing mechanism can include a spring.

ACTUATOR UTILIZING PNEUMATIC MUSCLES

TECHNICAL FIELD

This disclosure relates to an actuator that utilizes pneumatic muscles.

BACKGROUND

Many aircraft use actuators in systems that provide additional stability or assist pilot operation. For example, an aircraft can include an Automatic Flight Control System (AFCS) to augment pilot operation of the aircraft and communicate pilot input to components of the aircraft. In some cases, actuators are designed to limit instability or unwanted movement upon actuator failure. For example, an actuator can be designed to remain fixed upon detection of a failure of the actuator, so that unwanted or erroneous actuator outputs are not transmitted to other components.

SUMMARY

This disclosure describes technologies relating actuating components using pneumatic muscles.

In some aspects, an actuation system includes a pneumatic muscle connected to a component to be actuated. The system also includes an actuation member connected in series to the pneumatic muscle and valve connected to the pneumatic muscle to control a pressure in the pneumatic muscle. The system also includes a positioning mechanism connected to the component to control a movement of the component and a controller connected to the pneumatic muscle, the valve, and the positioning mechanism, the controller to control actuation of the component by controlling the pressure in the pneumatic muscle.

This, and other aspects, can include one or more of the following features. The pneumatic muscle can be a first pneumatic muscle and the actuation member can be a second pneumatic muscle. The first pneumatic muscle can be in a contracted state when the second pneumatic muscle is in an extended state, and the first pneumatic muscle can transition to an extended state when the second pneumatic muscle transitions to a contracted state. Each of the controller and the valve can be connected to the second pneumatic muscle, and the controller can be configured to control the valve to control the pressure in the first pneumatic muscle and a pressure in the second pneumatic muscle. To actuate the component in a first direction, the controller can be configured to perform operations including controlling the valve to apply an increasing pressure in the first pneumatic muscle and controlling the valve to apply a decreasing pressure in the second pneumatic muscle while applying the increasing pressure in the first pneumatic muscle. To actuate the component in a second direction opposite the first direction, the controller can be configured to perform operations including controlling the valve to apply a decreasing pressure in the first pneumatic muscle and controlling the valve to apply a increasing pressure in the second pneumatic muscle while applying the decreasing pressure in the first pneumatic muscle. The controller can be configured to perform operations including storing an expected position of the component at a time instant, determining a measured position of the component at the time instant, and comparing the expected position with the measured position. The positioning mechanism can include a brake. The controller can be configured to perform operations including transmitting a control signal to the brake in response to determining that the expected position does not match the measured position. The brake Some aspects of the subject matter described here can be implemented as an actuation system to control actuation of a component. The system includes a pneumatic muscle and an actuation member connected in series to a component to be actuated. The system also includes a brake connected to the component to control a movement of the component and a controller connected to the pneumatic muscle and the brake, the controller to control the brake to lock movement of the component based on a failure of the pneumatic muscle.

This, and other aspects, can include one or more of the following features. The brake can be a first brake, and the controller can be a first controller. The system can also include a second brake connected to the component to control the movement of the component and a second controller connected to the pneumatic muscle and the second brake, the second controller to control the second brake to lock movement of the component based on the failure of the pneumatic muscle. The first controller can be configured to determine a position of the component at a time instant, and the second controller can be configured to determine a position of the component at a time instant. Either the first controller or the second controller can be configured to compare the position of the component determined by the first controller with the position of the component determined by the second controller at the time instant. Either the first controller or the second controller can be configured to determine that the position of the component determined by the first controller does not match the position of the component determined by the second controller at the time instant, and can responsively activate either the first brake or the second brake, respectively, to lock the movement of the component. The component can be a rotorcraft component. The actuation member can be a pneumatic muscle or a bias spring.

Some aspects of the subject matter described here can be implemented as a method including actuating movement of a component by alternately controlling a pressure in a pneumatic muscle connected to the component between an increasing pressure and a decreasing pressure. The method includes using a first controller, periodically determining a position of the component while controlling the pressure in the pneumatic muscle. The method also includes using a second controller, periodically determining the position of the component while controlling the pressure in the pneumatic muscle. The method also includes activating a brake to lock movement of the component in response to determining that, at a time instant, the position determined by the first controller does not match the position determined by the second controller.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 1-D shows a second example implementation of an actuation system in which the pneumatic muscles actuate to rotate a rotatable component.

Like reference numbers and designations in the various drawings indicate like elements.

DETAILED DESCRIPTION

This disclosure relates to an actuator that utilizes pneumatic muscles. Some aircraft (e.g., airplanes, rotorcraft, or other aircraft) use an Automatic Flight Control System (AFCS) to improve aircraft stability during operation and to assist the pilot's control of the aircraft. For example, the AFCS can use one or more actuators in series with the pilot controls to adjust the flight of the aircraft by superimposing additional commands onto the pilot's commands. The actuators that are coupled to the pilot controls can also transfer the pilot commands to a boost actuator or another aircraft system. Some ACFS use hydraulic actuators, but hydraulic actuators are sometimes integrated into other systems, which negatively affects portability and versatility. Furthermore, despite seals, hydraulic actuators can leak hydraulic fluid into the aircraft. Some AFCS use electro-mechanical actuators, but electro-mechanical actuators can be costly and add significant weight to the aircraft. In some cases, an actuator that fails enters an uncontrolled state that results in an unsafe lack of control for the pilot.

This disclosure describes a fail-fixed actuator using pneumatic muscles. A pneumatic muscle, also known as a fluid actuator, is a linear actuator that is operated by fluid pressure. Typically, the operational fluid is a gas such as compressed air. A pneumatic muscle includes a closed membrane or tube that has opposite ends attached to mechanical components. For example, one end of the membrane can be attached to the load, and the other end of the membrane can be attached to a fixed component. As the membrane is inflated with gas, it bulges outward and contracts axially, exerting a pulling force on the load. The magnitude of the applied force is a function of the air pressure applied and the muscle stroke. Conversely, as gas is exhausted out of the membrane, the membrane relaxes and the pulling force reduces. In this manner, a pneumatic muscle is a contractile device and can generate motion in only one direction. In some cases, the membrane is covered by a sleeve to protect the membrane and provide tension. For example, the sleeve can be made of netted or braided fibers, and the tension can be specified by the geometry and composition of the fibers.

In some implementations of a pneumatic muscle actuator, a pair of pneumatic muscles is arranged antagonistically. In an antagonistic arrangement, each pneumatic muscle is connected to the load to exert a pulling force in opposite directions. To actuate the load in one direction from an equilibrium condition, an increase in pressure is applied in the first pneumatic muscle of the pair while reducing pressure in the second pneumatic muscle of the pair while applying the increased pressure in the first pneumatic muscle. The increased pressure in the first pneumatic muscle causes the first pneumatic muscle to contract to a compressed state, imparting a pulling force on the load. The reduced pressure in the second pneumatic muscle causes the second pneumatic muscle to transition to an extended state. In the extended state, the second pneumatic muscle imparts less pulling force on the load than the first pneumatic muscle. Thus, the load is translated toward the first pneumatic muscle. To translate the load in the opposite direction, an increased pressure is applied to the second pneumatic muscle and a reduced pressure is applied to the first pneumatic muscle. Alternately supplying increased and reduced pressure to the pneumatic muscles can thus selectively actuate the load in opposite directions.

The actuator described in this disclosure includes at least one pneumatic muscle coupled to a positioning mechanism. In some implementations, the positioning mechanism includes a brake to fix the position of the actuated component. In some implementations, the positioning mechanism includes a biasing mechanism (e.g., a spring or other mechanism) to bias the component toward a position. Independent controllers can monitor, determine and crosscheck, at least, the expected position of the actuator, the measured position of the actuator. In some implementations, in the event of an actuator failure, the positioning mechanism can be activated to brake to prevent the pneumatic muscle from moving, sometimes called a "fail-fixed" operation. For example, the actuator can include two position sensors and activate the positioning mechanism to brake if the position sensors disagree on their positions, possibly indicating a failure. For example, two controllers can agree on the expected position of the actuator. The controllers can also agree on the measured position of the actuator as determined by the position sensors. Any disagreement between the controllers can indicate a failure, and a controller can act to fix the actuator in position by engaging one or more positioning mechanisms. The positioning mechanisms can be power-to-release, so that upon a controller failure, the actuator will fail fixed. For increased safety and reliability, more than one controller could be required to maintain power-to-release for each positioning mechanism. A controller can also release pressure to the pneumatic muscles (while maintaining system pressure) if a single operational positioning mechanism cannot hold reliably against the maximum force output of a muscle (e.g., in the case of a valve jam). In some implementations, in the event of an actuator system failure, the positioning mechanism can bias the actuator to a position. For example, the controller can release pressure to the pneumatic muscles, allowing a force imparted by the positioning mechanism to move the component to a position. In some implementations, the positioning mechanism can include both a brake and a biasing mechanism.

Fixing the failed actuator or biasing the actuator position prevents it from introducing uncontrolled or inaccurate commands to the aircraft or adding undesirable dead-band to pilot inputs, and thus is an important safety consideration. As a single pneumatic muscle provides force in only one direction, the pneumatic muscle can be coupled to an actuation member such as a bias spring or a second pneumatic muscle to provide an antagonistic force in a second direction. As pneumatic muscles are largely gas-filled membranes, they can be lighter than other actuator types such as hydraulic actuators, linear motors, or electro-mechanical actuators, while providing comparable force. Less aircraft weight can reduce fuel consumption and increase efficiency. The actuator described here can also be cheaper to manufacture than other actuator types such as hydraulic and electro-mechanical actuators. Pneumatic muscles can be easily replaced, and do not leak hydraulic fluid. The actuator described here can have a bandwidth of at least 100 Hz, which is suitable for many aircraft applications. For example, the actuator can provide actuation at a frequency greater than the rotor rotation frequency for exciting desirable high-frequency vibrational modes in the rotor blades during rotation.

Figure 1A:
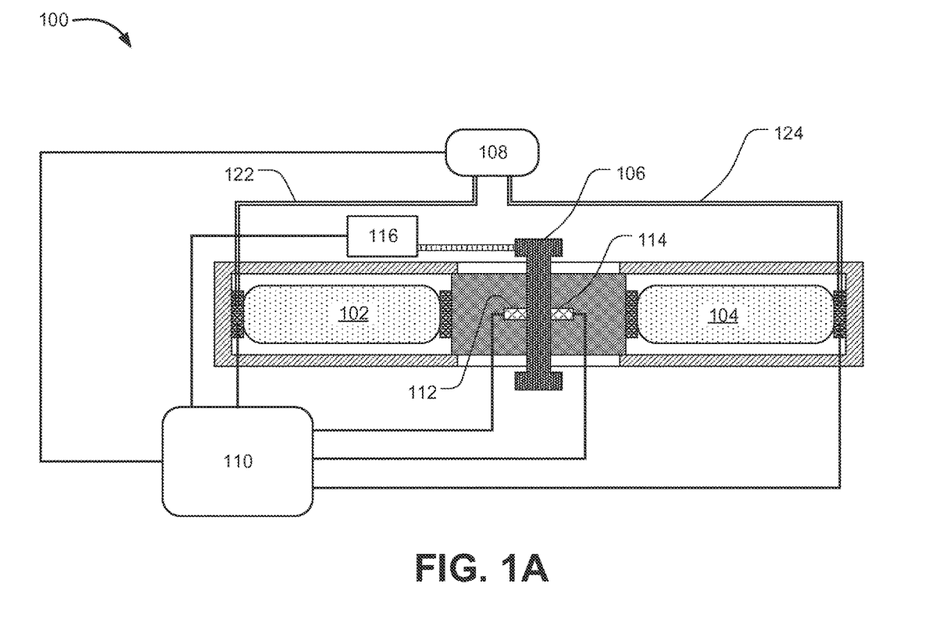
FIGS. 1A-C show a schematic diagram of a first implementation of an example actuation system, including an example actuated component.
Figure 1B:
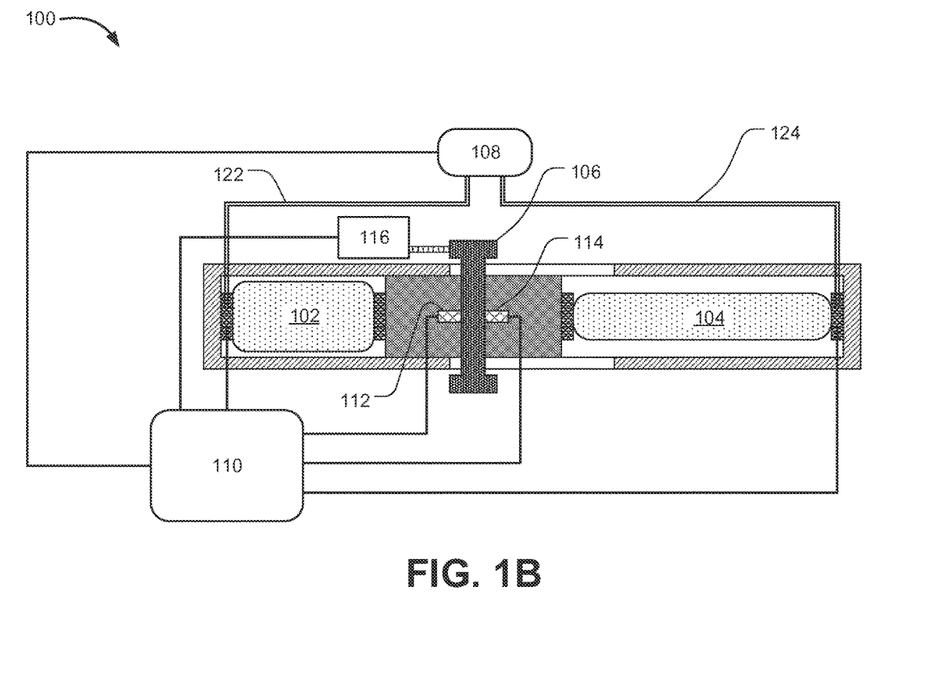
Figure 1C:
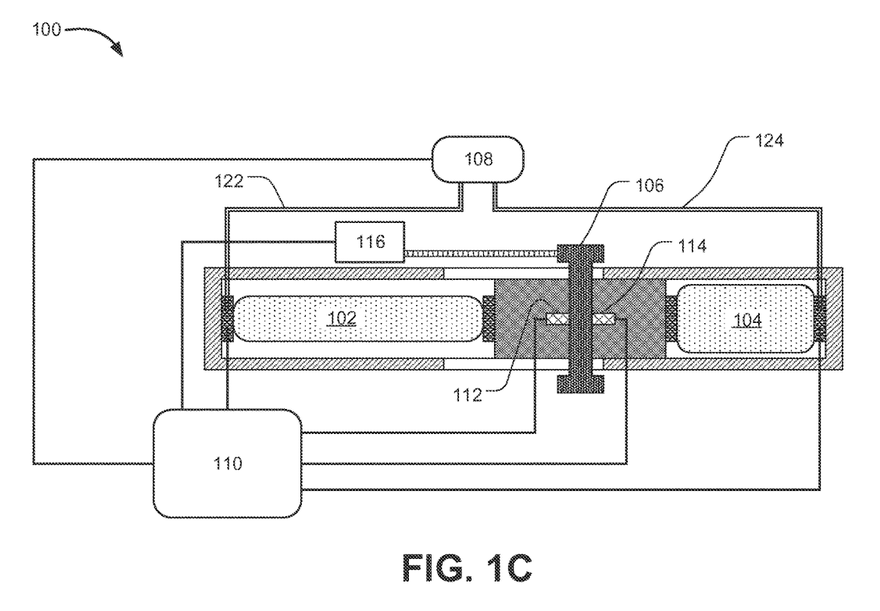

FIGS. 1A-C show a schematic diagram of a first implementation of an example actuation system 100, including example actuated component 106. The component 106 can be, for example, a component in a rotorcraft, such as an AFCS component or a mechanical linkage. The actuation system 100 uses a pneumatic muscle as an actuation member, and includes a first pneumatic muscle 102 and a second pneumatic muscle 104 connected to the component 106. Gas is supplied to pneumatic muscles 102, 104 through valve 108 via conduits 122, 124, respectively. The valve 108 can control the pressure of the gas in the pneumatic muscles 102, 104. The actuation system 100 also includes a positioning mechanism 116 that is connected to the component 106 to control movement of the component 106. In some implementations, the positioning mechanism 116 is connected to one or both pneumatic muscles 102, 104. The actuation system 100 also includes a controller 110 connected to the pneumatic muscles 102, 104, the valve 108, and the positioning mechanism 116. The controller 110 controls actuation of the component 106 by controlling the respective pressures in the pneumatic muscles 102, 104 by controlling the valve 108.

Figure 1D:
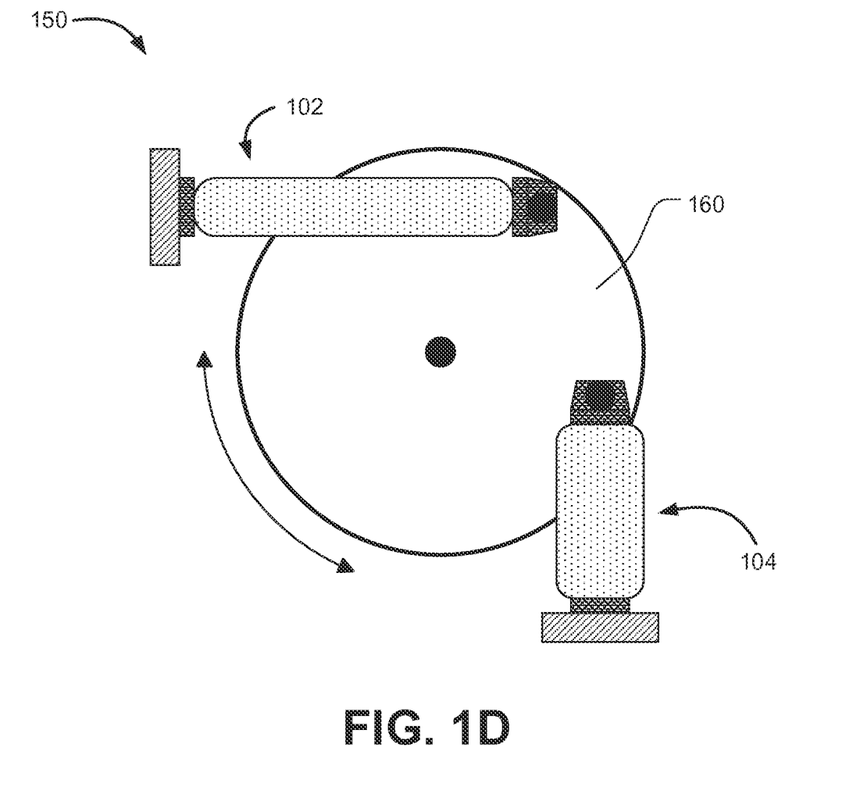

The first pneumatic muscle 102 and the second pneumatic muscle 104 are connected to the component 106 antagonistically, in that each pneumatic muscle 102, 104 generates force in an opposite direction. In this manner, the component 106 can be actuated linearly in opposite directions by selectively pressurizing each pneumatic muscle 102, 104. In some implementations, the pneumatic muscles 102, 104 are arranged at an angle. In some implementations, the pneumatic muscles 102, 104 can actuate a component in a rotational direction. For example, FIG. 1D shows a second example implementation of an actuation system 150 in which the pneumatic muscles 102, 104 actuate to rotate a rotatable component 160. In actuation system 150, the pneumatic muscles 102, 104 are arranged at a 90° angle. In other implementations, the pneumatic muscles 102, 104 are arranged at a different angle (e.g., 40°, 45°, 120°, etc.). In other implementations, the pneumatic muscles 102, 104 can be in a pulley configuration to rotate a rotatable component 106. For example, an end of each pneumatic muscle 102, 104 can be attached to the rotatable component 106 by a cord or strap. In a pulley-type configuration, the pneumatic muscles 102, 104 can be arranged parallel to each other or at an angle to each other.

FIG. 1A shows the actuation system 100 with pneumatic muscles 102, 104 in a relaxed (i.e., unpressurized) state. In some cases, both pneumatic muscles 102, 104 are pressurized to specific respective pressures prior to actuation. In some implementations, more than one pair of pneumatic muscles can be used. For example, two (or more) pneumatic muscles can be arranged in parallel to actuate in one direction, and two (or more) pneumatic muscles can be arranged in parallel to actuate in another direction. In this manner, additional force can be applied to the component by using multiple pairs of pneumatic muscles. Additionally, should one pneumatic muscle fail, the other pneumatic muscles can still maintain operation of the actuation system. Multiple pneumatic muscles in series can actuate a component over a longer distance in a direction than a single pneumatic muscle.

The example valve 108 controls the gas supplied to or removed from the pneumatic muscles 102, 104. The valve 108 can be a single valve or a combination of valves. For example, the valve 108 can be a directional control valve (e.g., a spool valve) that only permits gas to flow to a single pneumatic muscle 102, 104 at any time. In some implementations, the valve 108 is connected to a pressure source (e.g., an air compressor, a pump, an accumulator, or other pressure source) and supplies gas from the gas source to the pneumatic muscles 102, 104. In some implementations, the valve 108 is connected to a vacuum source to remove gas from the pneumatic muscles 102, 104. In some implementations, the valve 108 is connected to the atmosphere to reduce pressure by venting the gas from the pneumatic muscles 102, 104. For example, the valve can reduce pressure to the pneumatic muscles 102, 104 using a vacuum pump, an exhaust vent, or another pneumatic system.

The example controller 110 is configured to control the valve 108 to actuate the component 106 by alternately controlling the pressure in the pneumatic muscles 102, 104 between an increasing pressure and a decreasing pressure. For example, the controller 110 can send signals to the valve 108 or control the valve 108 via a mechanical coupling. FIG. 1B shows a schematic diagram of actuation system 100 in which the controller 110 has controlled the valve 108 to actuate component 106 toward the first pneumatic muscle 102. To actuate as shown in FIG. 1B, the controller controls the valve 108 to apply an increasing pressure in the first pneumatic muscle 102 and a decreasing pressure in the second pneumatic muscle 104. The first pneumatic muscle 102 contracts under increased pressure and pulls the component 106, as shown in FIG. 1B. The second pneumatic muscle 104 relaxes to an extended state under reduced pressure and allows the first pneumatic muscle 102 to pull the component 106.

FIG. 1C shows the actuation system 100 in which the component 106 has been actuated in an opposite direction, i.e., toward the second pneumatic muscle 104. To actuate as shown in FIG. 1C, the controller controls the valve 108 to apply a reduced pressure in the first pneumatic muscle 102 and an increased pressure in the second pneumatic muscle 104 while applying the reduced pressure in the first pneumatic muscle 102. The second pneumatic muscle 104 contracts under the applied increase in pressure and pulls the component 106, as shown in FIG. 1C. Under reduced pressure, the first pneumatic muscle 102 relaxes to an extended state and allows the second pneumatic muscle 104 to pull the component 106.

The controller 110 can control the valve 108 to control the pressures at frequencies up to 100 Hz. In some implementations, the controller 110 can control the valve 108 to control the pressures at frequencies greater than 100 Hz. In some implementations, the controller 110 controls the valve 108 in response to receiving a signal from another system. For example, the controller can receive a signal from the AFCS on an aircraft, a flight control computer, the avionics system on an aircraft, or another system. In some implementations, the controller 110 is included as part of another system, such as a computer system or other data processing apparatus. For example, the controller 110 can be incorporated as part of a flight control computer, an AFCS, the avionics system on an aircraft, or another system. In some implementations, a controller includes one processor or a crosschecking pair of processors. Each processor can use its own conditioning circuitry for its associated transducer and positioning mechanism.

The positioning mechanism 116 can to activate to lock, restrict, or control movement of the component 106 in response to receiving a signal from the controller 110. For example, if the controller 110 detects a failure or anomaly in the actuation system 100, the controller 110 can send a signal to the positioning mechanism 116 to lock the component 106 in place. In some implementations, the positioning mechanism 116 is connected to the component 106 and locks movement of the component 106 such that pressurizing the pneumatic muscles 102, 104 does not actuate the component 106. In some implementations, the positioning mechanism 116 is connected to the pneumatic muscles 102, 104 and locks movement of the pneumatic muscles 102, 104 to lock movement of the component 106. The positioning mechanism 116 can be a mechanical brake mechanism (e.g., locking teeth, a clamp, or other mechanism), an electromagnetic brake mechanism, or another type of brake mechanism. In some implementations, the positioning mechanism 116 is connected to a pneumatic system or a hydraulic system of an aircraft. In some implementations, the positioning mechanism 116 includes multiple separate mechanisms to lock movement of the component 106 that can be activated by a control signal from the controller 110. In this manner, if one brake mechanism fails, at least one other positioning mechanism can still activate to lock movement of the component 106.

The positioning mechanism 116 can also include a biasing mechanism that is configured to bias the actuator toward a position. For example, upon detection of a failure, the controller 110 can deactivate pressure to pneumatic muscles 102, 104 and allow the biasing mechanism to move the component to a position. For example, the positioning mechanism 116 can include a biasing mechanism such as one or more springs that can impart a force on the component. The positioning mechanism 116 can bias the actuator to a position such as a central position of actuator travel, a limit of actuator travel, or another position. In this manner, an actuation system 100 connected in parallel to another system can be decoupled from the system if the actuation system 100 fails.

The example actuation system 100 also includes a first position transducer 112 and a second position transducer 114 that are connected to the component 106 and the controller 110. The position transducers 112, 114 can be affixed to the component 106, a housing, or another part of the actuation system 100. In some implementations, a position transducer 112, 114 is located adjacent to the component 106. In some implementations, one or both of the position transducers 112, 114 are stationary relative to the component 106. In some implementations, part of a position transducer 112, 114 is stationary and another part of the position transducer 112, 114 translates with the component 106. The position transducers 112, 114 can periodically determine the measured position of the component 106 and transmit position signals to the controller 110. The position transducers 112, 114 can determine the component 106 position at multiple time instances, and each position signal can identify the measured position of the component 106 at a respective time instant. The controller 110 can store an expected position of the component 106 at a time instant, and compare the expected component 106 position to a measured component 106 position identified by one or more position signals for that time instant. In some cases, an actuation system failure can be signified by the expected component 106 position not matching the identified measured component 106 position. In some cases, an actuation system failure can also be signified by the measured component 106 position identified by the first position transducer 112 not matching the measured component 106 position identified by the second transducer 114. Upon detection of a failure such as a position mismatch, the controller 110 can transmit a control signal to the positioning mechanism 116 to activate the positioning mechanism 116 and lock movement of the component 106.

The actuation system 100 can be implemented in a control application, such as an AFCS or another control application or system. The actuation system 100 can be connected in series to an actuation system, another actuator (e.g., as an input to a boost actuator or other actuator), a control application, or another system. In some implementations, the actuation system 100 is connected in a parallel configuration to another system or actuation system (e.g., a boost actuator or other system). The actuation system 100 could be used to actuate components used in aircraft applications such as fixed-wing aircraft, tiltrotor aircraft, rotorcraft, or other aircraft. The actuation system 100 could also be used to actuate components used in other applications such as automotive systems (e.g. automobiles, ATVs, motorcycles, or other automotive systems), submersible systems, marine systems (e.g. personal watercraft, boats, or other marine systems), agricultural systems (e.g. tractors or other agricultural systems), power equipment (e.g. generators, lawn mowers, or other power equipment), construction equipment (e.g. industrial vehicles, heavy machinery, or other equipment), or other systems.

Figure 2:
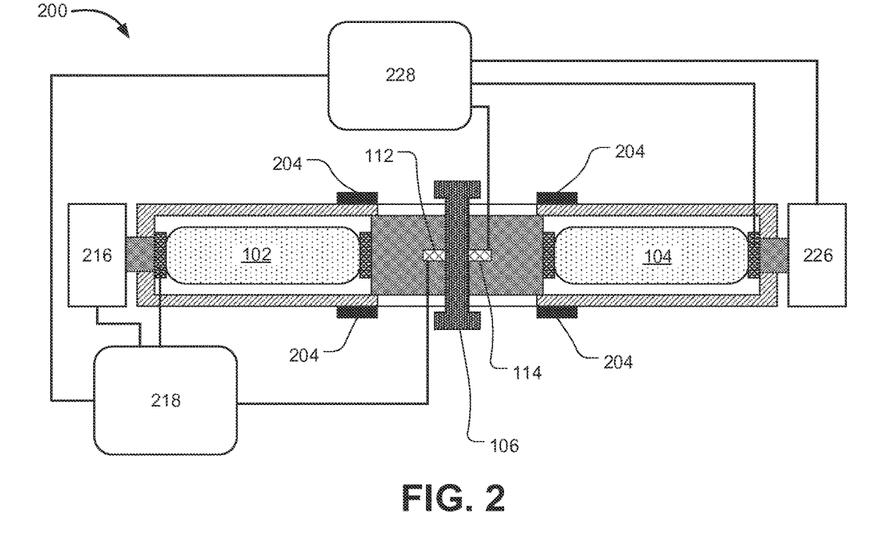
FIG. 2 shows a schematic diagram of a third example implementation of an actuation system.

FIG. 2 shows a schematic diagram of a third example implementation of an actuation system 200. Like example actuation system 100, actuation system 200 uses a pair of pneumatic muscles 102, 104 to actuate a component 106. The actuation system 200 includes a first controller 218 and a second controller 228 that can be connected to each other, as shown. The controllers 218, 228 can be separate controllers or can be parts or modules of a single controller. In some implementations, both pneumatic muscles 102, 104 are connected to a single valve controlled by both controllers 218, 228. In some implementations, the first pneumatic muscle 102 is connected to a first valve controlled by the first controller 218, and the second pneumatic muscle 104 is connected to a second valve controlled by the second controller 228. The actuation system 200 also includes two example positioning mechanisms implemented as a first brake 216 and a second brake 226, respectively. In some implementations, one or both positioning mechanisms are implemented as a biasing mechanism. The first controller 218 is connected to the first brake 216 and the first position transducer 112, and the second controller 228 is connected to the second brake 226 and the second position transducer 114. First position transducer 112 and second position transducer 114 can periodically send first and second position signals to the first controller 218 and the second controller 228, respectively. The first position signals can identify a measured position of the component 106 as identified by the first position transducer 112. The second position signals can identify a measured position of the component 106 as identified by the second position transducer 114. The first controller 218 can send a control signal to the first brake 216, and the second controller can send a control signal to the second brake 226. In some implementations, a single brake is connected to multiple controllers, and each controller can send a control signal to the brake.

Via the first position transducer 112 and the second position transducer 114, the first controller 218 and the second controller 228 can determine the measured position of the component 106 at multiple time instances. The first controller 218 and/or the second controller 228 can be configured to compare the position of the component 106 determined by the first controller 218 with the position of the component determined by the second controller 228 at an instant of time. If a controller determines that the measured position determined by the first controller 218 does not match the measured position determined by the second controller 228, that controller can send a control signal to a brake to lock movement of the component 106. For example, if the first controller 218 determines that the position of the component 106 determined by the second controller 228 does not match its own determined position of the component 106, the first controller 218 can send a control signal to the first brake 216 to lock movement of the component 106. The same example could be applied to the second controller 228 and second brake 226.

In some implementations, more than two controllers are used in the actuation system. Each controller can be connected to a respective position transducer. In some implementations, if the position determined by a single controller disagrees with a number of remaining controllers, the single disagreeing controller can be ignored and no control signal transmitted to a positioning mechanism. For example, in an actuation system using three controllers, if a single controller's determined position disagrees with that of the other two controllers, that single controller can be ignored or disabled. In this manner, the actuation system can reduce the number of inaccurate fails due to an incorrectly determined position mismatch. In this example, two agreeing controllers can be sufficient to provide safe operation of the actuation system. The logic to ignore a single disagreeing controller can be included in one or more of the controllers or be included in a processing system such as a flight control computer or other system.

The actuation system 200 also includes example stops 204. The stops 204 limit the mechanical range of the component 106, and can be used as a safety feature to prevent overextension of the actuation system 200. In other implementations, more or fewer stops 204 are used, and can be positioned at any suitable locations on the actuation system 200 to limit movement range.

Figure 3:
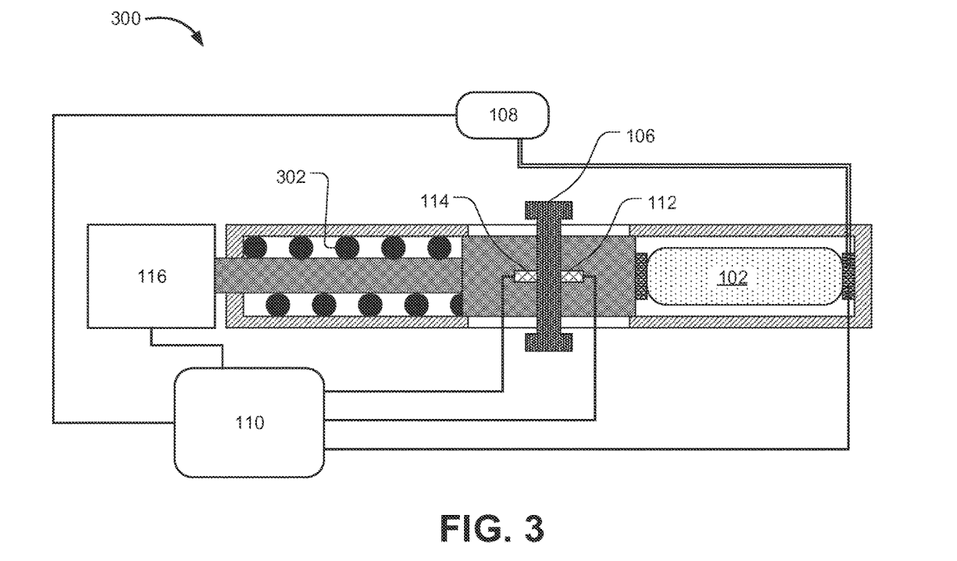
FIG. 3 shows a schematic of a fourth example implementation of an actuation system implementing a bias spring.

FIG. 3 shows a schematic of a fourth example implementation of an actuation system 300 implementing a bias spring 302. The actuation system 300 is similar to actuation system 100, but includes a bias spring 302 connected to the component 106 as the actuation member instead of a second pneumatic muscle. In some implementations, the bias spring 302 extends when the pneumatic muscle 102 is pressurized and contracts, pulling the component 106. The extended bias spring 302 exerts a pulling force on the component 106 in the direction opposite the pulling force of the pneumatic muscle 102. When the pneumatic muscle 102 is depressurized and the pulling force of the pneumatic muscle 102 lessens, the bias spring 302 retracts. During the retraction of the bias spring 302, the pulling force of the bias spring 302 pulls the component 106 toward the bias spring 302. In this manner, the component 106 can be actuated in opposite directions using a single pneumatic muscle 102. In some implementations, the bias spring 302 is configured to compress when the pneumatic muscle 102 is pressurized and contracts. In the compressed state, the bias spring 302 exerts a pushing force on the component 106 in the direction opposite the pulling force of the pneumatic muscle 102. When the pneumatic muscle 102 is depressurized and relaxes, the bias spring 302 extends. As the bias spring 302 extends, it pushes the component 106 away from the pneumatic muscle 102. In this manner, the component 106 can be actuated in opposite directions using a single pneumatic muscle 102. An actuation system using a bias spring such as actuation system 300 can be used to rotate a component or actuate a component linearly. In some implementations, the bias spring 302 and the pneumatic muscle 102 are at an angle. In some implementations, the actuation system 300 includes more than one bias spring 302 and/or more than one pneumatic muscle 102.

Figure 4:
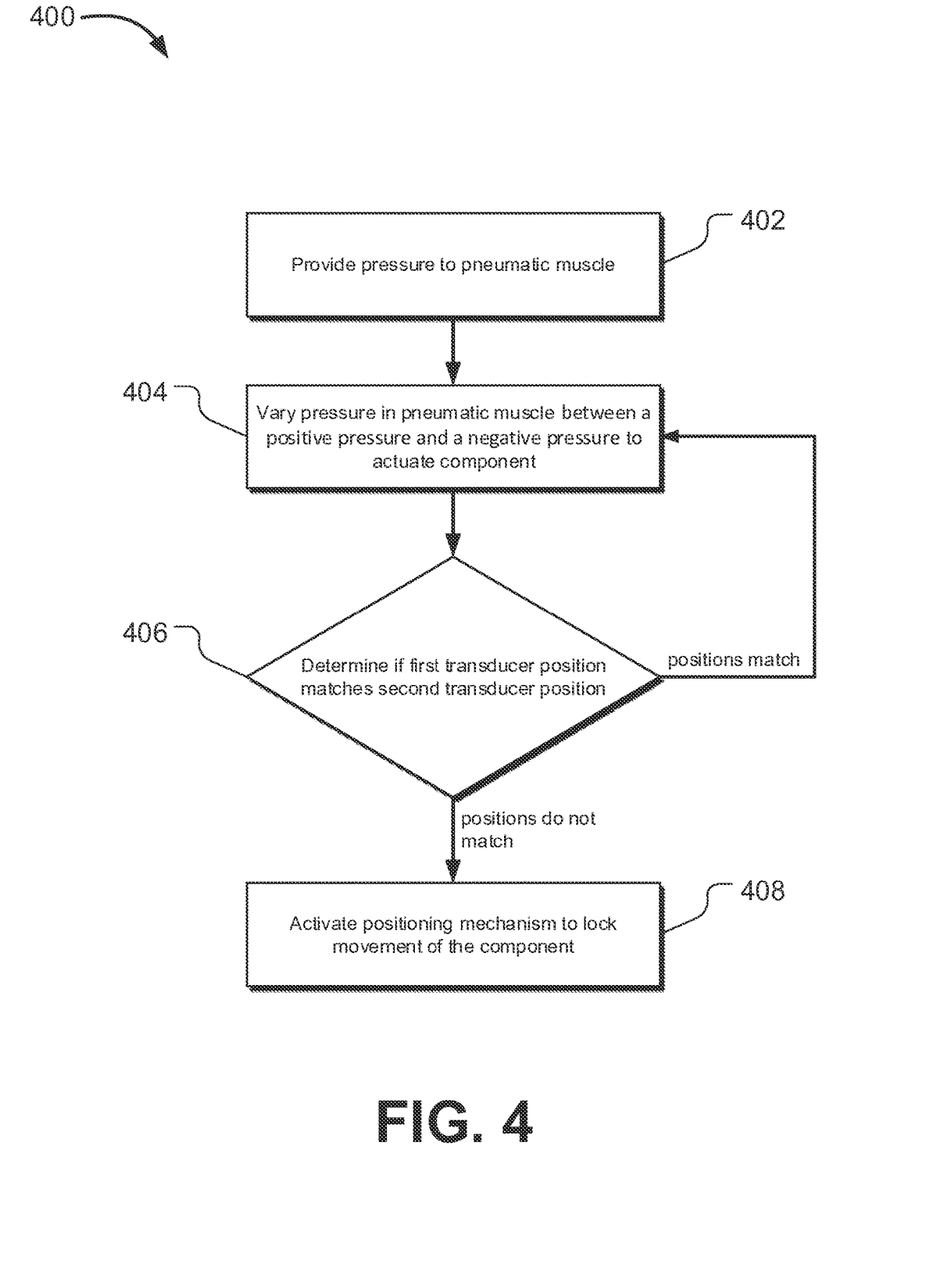
FIG. 4 is a flowchart of an example actuation process that can be implemented by any one of the example actuation systems.

FIG. 4 shows a flowchart of an example actuation process 400 that can be implemented by example actuation systems 100, 150, 200, or 300. The actuation process 400 can be used for actuation systems that have one or more controllers or valves, and two or more position transducers. At 402, gas pressure is provided to a pneumatic muscle. For example, the pressure can be provided by a gas source such as an air compressor or other source as described previously. The gas pressure can be provided through one or more valves that are controlled by one or more controllers. At 404, a pressure in the pneumatic muscle is varied between increasing and decreasing pressure to actuate the component. For example, a controller can control the valve to alternately supply increasing and decreasing pressure to the pneumatic muscle, as described previously. In some implementations, the actuation member is a second pneumatic muscle, and pressure in the second pneumatic muscle is also varied between a increasing pressure and a decreasing pressure.

At 406, multiple position transducers determine the position of the component. If the component position determined by a first transducer and the component position determined by a second transducer match, the process returns to 404 and continues. If the positions do not match each other or the expected position in a controller, the process proceeds to 408. For example, one or more controllers can be connected to the transducers, and the controllers can determine the component position from each transducer and/or check if the positions match. In some implementations 404 and 406 are simultaneous, i.e., the position of the component is periodically determined while the pressures in the pneumatic muscles are varied.

At 408, a positioning mechanism is activated in response to determining that the positions do not match. The positioning mechanism engages, locking movement of the component. For example, a controller can send an activation signal to a positioning mechanism to activate a brake included in the positioning mechanism.

Figure 5:
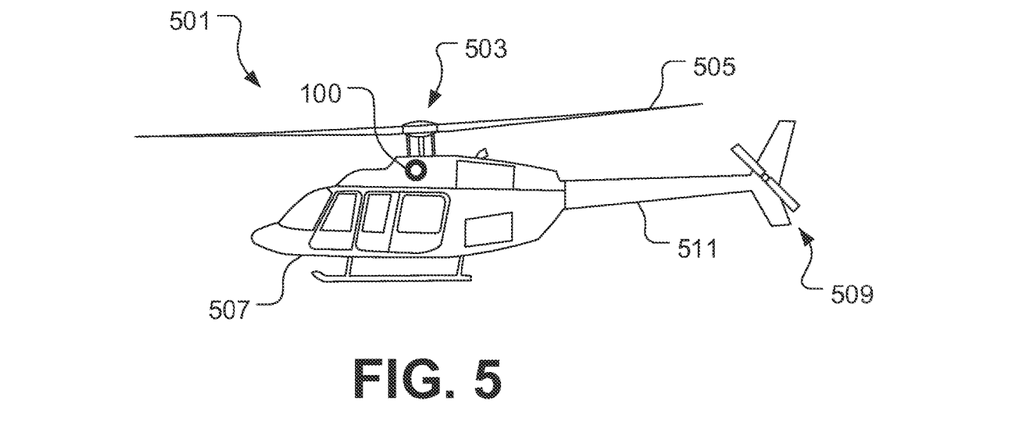
FIG. 5 is a schematic diagram showing an example of a rotorcraft.

The example actuation systems 100, 150, 200, and 300 can be used to actuate components in an aircraft. As an example, FIG. 5 shows a schematic diagram of an example rotorcraft 501. Rotorcraft 501 has a rotor system 503 with multiple rotor blades 505. Rotorcraft 501 can further include a fuselage 507, anti-torque system 509, and an empennage 511. An actuation system 100 is shown in an example location within a flight control system of the rotorcraft 701.

Figure 6:
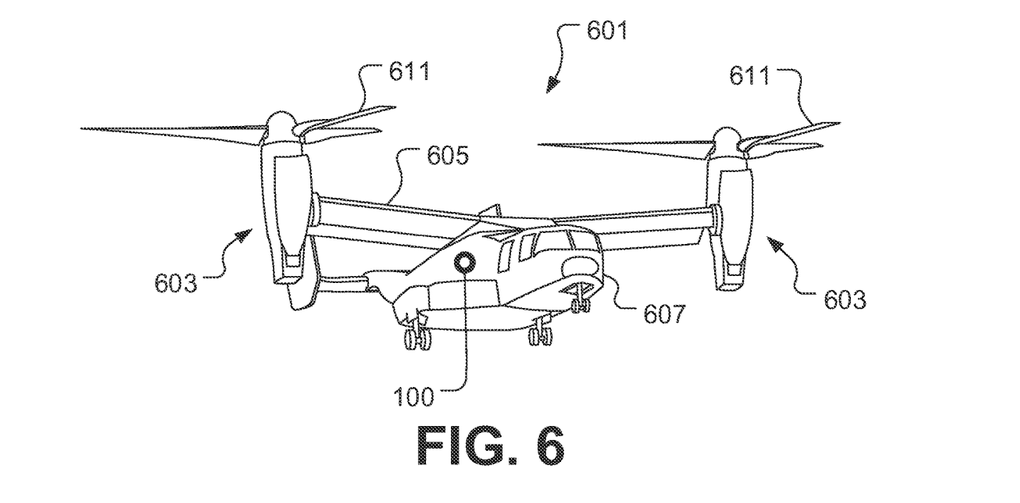
FIG. 6 is a schematic diagram showing an example of a tiltrotor aircraft.

As another example aircraft, FIG. 6 shows a schematic diagram of an example tiltrotor aircraft 601. Aircraft 601 includes a fuselage 607 with attached wings 605. Nacelles 603 are carried at the outboard ends of wings 605 and are rotatable between the helicopter-mode position shown and a forward-facing airplane-mode position (not shown). Nacelles 603 carry engines and transmissions for powering rotor systems 611 in rotation. An engine may be an internal combustion engine, an electrical power source and associated motor, or any other suitable technique for powering rotor system 611. An actuation system 100 is shown in an example location within a flight control system of the tiltrotor aircraft 601.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An aircraft actuation system comprising:
a first pneumatic muscle connected to an aircraft component to be actuated;
a second pneumatic muscle or a bias spring connected to the aircraft component such that the second pneumatic muscle or the bias spring is connected antagonistically in series to the first pneumatic muscle to linearly actuate the aircraft component;
a valve connected to the first pneumatic muscle to control a pressure in the first pneumatic muscle;
a positioning mechanism connected to one or more of the aircraft component, the first pneumatic muscle, the second pneumatic muscle or the bias spring to restrict a movement of the aircraft component, wherein the positioning mechanism comprises a biasing mechanism or a brake or both; and
a controller connected to the first pneumatic muscle, the valve, and the positioning mechanism, the controller to control actuation of the aircraft component by controlling the pressure in the first pneumatic muscle, and to transmit a control signal to the positioning mechanism to restrict the movement of the aircraft component in response to determining that the aircraft component is not at an expected position.

2. The system of claim 1, wherein the first pneumatic muscle is in a contracted state when the second pneumatic muscle is in an extended state, and wherein the first pneumatic muscle transitions to an extended state when the second pneumatic muscle transitions to a contracted state.

3. The system of claim 2, wherein each of the controller and the valve is connected to the second pneumatic muscle, and wherein the controller is configured to control the valve to control the pressure in the second pneumatic muscle.

4. The system of claim 2, wherein, to actuate the aircraft component in a first direction, the controller is further configured to perform operations comprising:
controlling the valve to apply an increasing pressure in the first pneumatic muscle; and
controlling the valve to apply a decreasing pressure in the second pneumatic muscle while applying the increasing pressure in the first pneumatic muscle.

5. The system of claim 4, wherein, to actuate the aircraft component in a second direction opposite the first direction, the controller is further configured to perform operations comprising:
controlling the valve to apply a decreasing pressure in the first pneumatic muscle; and
controlling the valve to apply a increasing pressure in the second pneumatic muscle while applying the decreasing pressure in the first pneumatic muscle.

6. The system of claim 1, wherein the controller is further configured to perform operations comprising:
storing the expected position of the aircraft component at a time instant; determining a measured position of the aircraft component at the time instant; and comparing the expected position with the measured position.

7. The system of claim 6, wherein the positioning mechanism is the brake, and wherein the controller transmits the control signal to the brake in response to determining that the expected position does not match the measured position, and wherein the brake is configured to activate to lock movement of the aircraft component in response to receiving the control signal from the controller.

8. The system of claim 6, further comprising a position transducer connected to the controller, wherein the position transducer is configured to transmit a plurality of position signals to the controller at a respective plurality of time instants, each position signal identifying the measured position of the aircraft component at a respective time instant.

9. The system of claim 1, wherein the positioning mechanism is the brake, the controller is a first controller, and wherein the system further comprises:
a first position transducer connected to the first controller, wherein the first position transducer is configured to transmit a plurality of first position signals to the first controller at a respective plurality of time instants, each first position signal identifying a measured position of the aircraft component at a respective time instant;
a second controller connected to the brake; and a second position transducer connected to the second controller, wherein the second position transducer is configured to transmit a plurality of second position signals to the second controller at the respective plurality of time instants, each second position signal identifying a measured position of the aircraft component at a respective time instant.

10. The system of claim 9, wherein the brake is a first brake, and wherein, at a time instant, the first controller is configured to perform operations comprising:
   determining that the measured position determined by the first controller does not match the measured position determined by the second controller; and
   transmitting the control signal to the first brake in response to determining that the measured position determined by the first controller does not match the measured position determined by the second controller, and wherein the first brake is configured to activate to lock movement of the aircraft component in response to receiving the control signal from the first controller.

11. The system of claim 10, wherein the positioning mechanism further comprises a second brake connected to the aircraft component or the second pneumatic muscle, and wherein the second controller is configured to transmit a control signal to the second brake in response to determining that the measured position determined by the first controller does not match the measured position determined by the second controller, and wherein the second brake is configured to activate to lock movement of the aircraft component in response to receiving the control signal from the second controller.

12. The system of claim 1, wherein the second pneumatic muscle or the bias spring is in a contracted state when the first pneumatic muscle is in an extended state, and wherein the second pneumatic muscle or the bias spring transitions to an extended state when the first pneumatic muscle transitions to a contracted state.

13. The system of claim 1, wherein the controller is configured to control the valve to alternately control the pressure in the first pneumatic muscle between an increasing pressure and a decreasing pressure at a frequency up to 100 Hz.

14. The system of claim 1, wherein the positioning mechanism is the biasing mechanism, the biasing mechanism configured to bias the aircraft component to a position when the first pneumatic muscle is de-pressurized.

15. The system of claim 14, wherein the biasing mechanism comprises a spring.

16. An actuation system to control actuation of an aircraft component, the system comprising:
   a first pneumatic muscle and one of a second pneumatic muscle or a bias spring connected antagonistically in series to the aircraft component to linearly actuate the aircraft component in an aircraft;
   a positioning mechanism connected to one or more of the aircraft component, the first pneumatic muscle, the second pneumatic muscle or the bias spring to restrict a movement of the aircraft component, wherein the positioning mechanism comprises a biasing mechanism or a brake or both; and
   a controller connected to the first pneumatic muscle and the positioning mechanism, the controller to transmit a control signal that controls the positioning mechanism to lock movement of the aircraft component based on a failure of the first pneumatic muscle in which the aircraft component is not at an expected position.

17. The system of claim 16, wherein the brake is a first brake, wherein the controller is a first controller, and wherein the system further comprises:
   a second brake connected to the aircraft component, the second pneumatic muscle or the bias spring to control the movement of the aircraft component; and
   a second controller connected to the second pneumatic muscle or the bias spring and the second brake, the second controller to control the second brake to lock movement of the aircraft component based on the failure of the second pneumatic muscle or the bias spring.

18. The system of claim 17, wherein the first controller is configured to determine a position of the aircraft component at a time instant, wherein the second controller is configured to determine a position of the aircraft component at a time instant, and wherein either the first controller or the second controller is configured to compare the position of the aircraft component determined by the first controller with the position of the aircraft component determined by the second controller at the time instant.

19. The system of claim 17, wherein either the first controller or the second controller is configured to determine that the position of the aircraft component determined by the first controller does not match the position of the aircraft component determined by the second controller at the time instant, and responsively activate either the first brake or the second brake, respectively, to lock the movement of the aircraft component.

20. A method comprising:
   providing a first pneumatic muscle and one of a second pneumatic muscle or a bias spring connected antagonistically in series to an aircraft component;
   providing a brake connected to one or more of the aircraft component, the first pneumatic muscle, the second pneumatic muscle or the bias spring;
   providing a controller connected to the first pneumatic muscle and the brake;
   using the controller, linearly actuating movement of the aircraft component by alternately controlling a pressure in the first pneumatic muscle connected to the aircraft component between an increasing pressure and a decreasing pressure;
   using the controller and one or more position sensors, periodically determining a position of the aircraft component while controlling the pressure in the first pneumatic muscle; and
   using the controller, transmitting a control signal that activates the brake to lock movement of the aircraft component in response to determining that, at a time instant, the position determined by the controller does not match an expected position.

* * * * *